United States Patent [19]

Takatsu

[11] 4,236,387
[45] Dec. 2, 1980

[54] ENERGY STORING DEVICE

[76] Inventor: Suehiro Takatsu, c/o Takatsu Seisakusho, 22, 3-chome, Nanabancho, Minato-ku, Nagoya-shi, Aichi-ken, Japan

[21] Appl. No.: 6,747

[22] Filed: Jan. 26, 1979

[30] Foreign Application Priority Data

Jan. 30, 1978 [JP] Japan ................. 53-9169

[51] Int. Cl.³ ............................. F16D 3/28
[52] U.S. Cl. ........................ 64/11 R; 64/27 NM; 267/153; 267/57.1 R; 267/33; 185/37
[58] Field of Search ............... 64/11 R, 27 NM, 27 S, 64/DIG. 2, 27 R, 6; 267/153, 57.1R, 33, 152, 140.4; 185/37, 39

[56] References Cited

U.S. PATENT DOCUMENTS

| 2,170,627 | 8/1939 | Berryman | 64/11 R |
| 2,295,316 | 9/1942 | Yates | 64/11 R |
| 2,830,780 | 4/1958 | Schloss | 267/153 |
| 3,409,284 | 11/1968 | Rix | 267/153 |
| 3,537,275 | 11/1970 | Smith | 64/27 NM |
| 3,901,495 | 8/1975 | Suzuki | 267/153 |
| 3,905,208 | 9/1975 | Oyama et al. | 64/DIG. 2 |

Primary Examiner—Ira S. Lazarus
Assistant Examiner—Magdalen Moy
Attorney, Agent, or Firm—Connolly and Hutz

[57] ABSTRACT

An energy storing device comprising an elastic cylindrical body of a diameter gradually increasing from one end thereof to the other with a spiral groove provided in the outer surface thereof, to store a rotary force and a thrust simultaneously.

3 Claims, 4 Drawing Figures

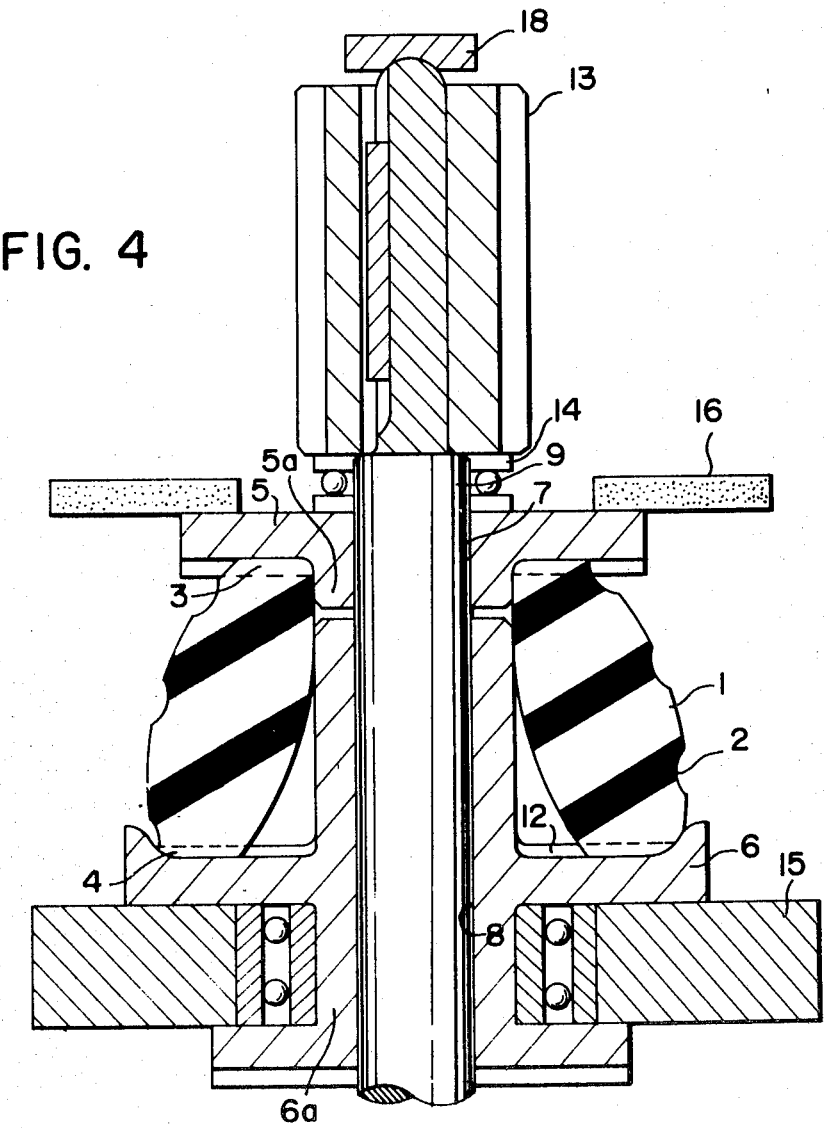

ENERGY STORING DEVICE

BACKGROUND OF THE INVENTION

1. Field of the Invention

The present invention relates to an energy storing device utilizing an elastic cylinder for simultaneously storing a rotary force and a thrust.

2. Description of the Prior Art

In a conventional energy storing device whereby energy of a rotary force and a thrust are stored, an energy storing means is not usually made of a cylinder since the torsion characteristics thereof are unstable, though the construction thereof is simple. In addition, energy of a rotary force and energy of a thrust are separately stored by energy storing means exclusively used for each thereof. An energy storing device for storing both a rotary force and a thrust at the same time has not been generally used.

SUMMARY OF THE INVENTION

An object of the present invention is to provide an energy storing device for storing not only a rotary force but also a thrust.

Another object of the present invention is to provide a simple and durable energy storing device using a cylinder to smoothly and stably store a rotary force and a thrust.

To these ends, the present invention provides an energy storing cylinder comprising an elastic cylindrical body the diameter of which is gradually increased from one end thereof to the other, the cylindrical body having a spiral groove in the outer surface thereof.

The above and other objects as well as the advantageous features of the invention will become apparent from the following description of the preferred embodiment taken in conjunction with the accompanying drawings.

BRIEF DESCRIPTION OF THE DRAWINGS

FIG. 3 is a plan view of a gear portion of the device shown in FIG. 2; and

FIG. 4 is a cross-sectional view of the device shown in FIG. 2, in which an energy is stored.

DETAILED DESCRIPTION OF THE INVENTION

An embodiment of an energy storing device according to the present invention will be described with reference to the drawings.

Figure 1:
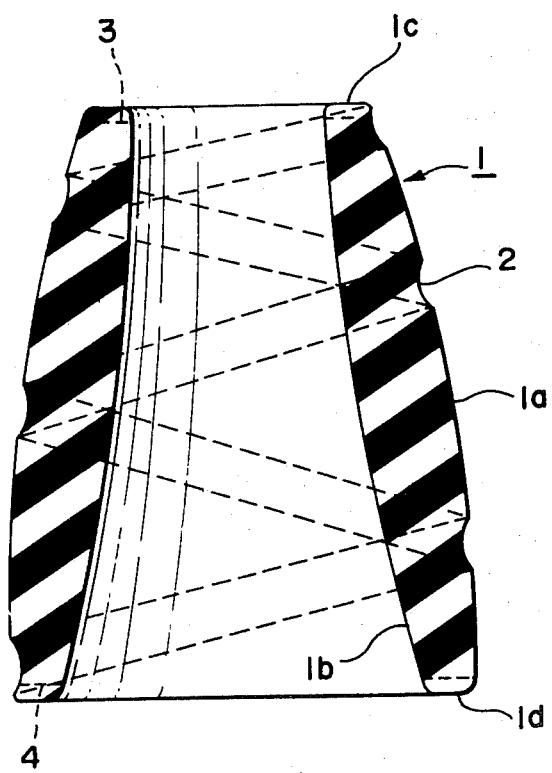
FIG. 1 is a cross-sectional view of an energy storing cylinder in an energy storing device according to the present invention.

First, an energy storing cylinder used in the energy storing device according to the present invention will be described with reference to FIG. 1.

An energy storing cylinder 1 consists of an elastic cylindrical body, the diameter of which is gradually increased from one end thereof to the other, having at least one spiral groove 2 in an outer surface 1a thereof. The spiral groove 2 may consist of a plurality of ones.

The diameter of an inner surface 1b of the energy storing cylinder 1 is gradually increased from one end thereof to the other, and the inner surface 1b is curved so that it is slightly projected in the radially inward direction. The diameter of the outer surface 1a of the energy storing cylinder 1 is gradually increased from one end thereof to the other, and the outer surface 1a is curved so that it is slightly projected in the radially outward direction. Namely, the thickness of the energy storing cylinder 1 is gradually increased from both ends thereof to the intermediate portion thereof. Both of end surfaces 1c, 1d of the energy storing cylinder 1 are parallel to each other and have radially extended engagement recesses 3, 4 therein.

The elastic energy storing cylinder 1 is made of rubber or resinous material. It is the most preferably made of polyurethane in view of the torsion characteristics, compression characteristics, durability and cost thereof.

An energy storing device using this energy storing cylinder 1 is constructed as follows.

Figure 2:
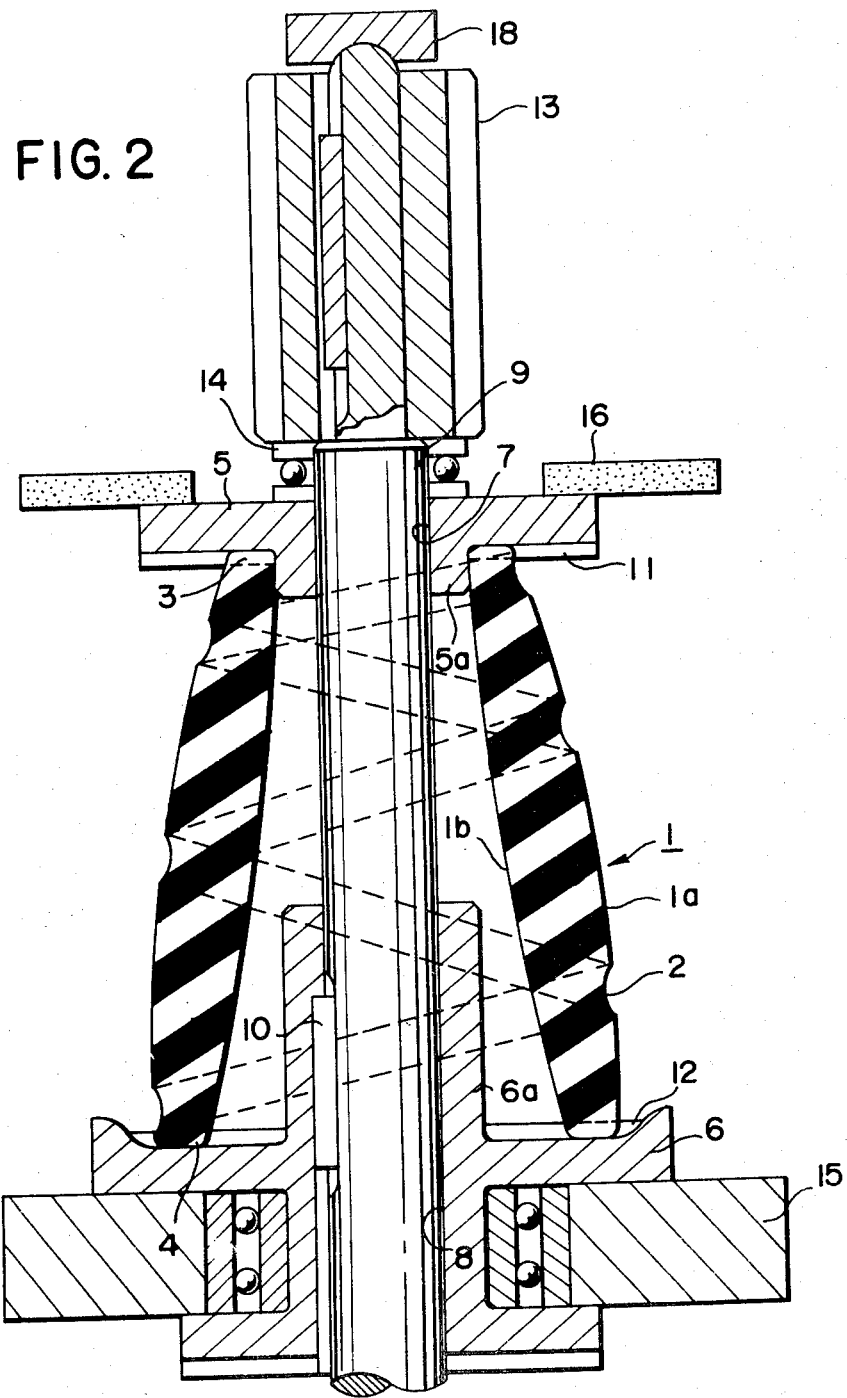
FIG. 2 is a cross-sectional view of an energy storing device according to the present invention.

A first flange 5 and a second flange 6 are respectively fitted into the end surfaces of the energy storing cylinder 1 as shown in FIG. 2. The flanges 5, 6 have holes 7, 8, respectively, in the central portions thereof. A spindle 9 is passed through the holes 7, 8 and cylinder 1. The flanges 5, 6 have boss portions 5a, 6a, respectively, which are extended along the spindle 9.

The first flange 5 is rotatably and slidably fitted around the spindle 9. The second flange 6 is non-rotatably fitted around the spindle 9 via a key 10 inserted therebetween as shown in FIG. 2.

The first flange 5 has a key 11 integrally formed on the end surface thereof that is on the side of the energy storing cylinder 1. When the key 11 is engaged with a recess 3 in the energy storing cylinder 1, the first flange 5 cannot be rotated relative to the cylinder 1. A vertically movable friction plate 16 is provided in the vicinity of the outer surface of the flange 5. When the plate 16 comes into contact with the flange 5, the flange 5 is non-rotatably retained while being allowed to frictionally move in the vertical direction.

A key 12 is integrally formed on the end surface of the second flange 6 that is on the side of the energy storing cylinder 1. When the key 12 comes into contact with a recess 4 in the energy storing cylinder 1, the second flange 6 cannot be rotated with respect to the energy storing cylinder 1.

A gear 13 is mounted on one end portion of the spindle 9 with a key. A thrust bearing 14 is provided between the gear 13 and first flange 5. The second flange 6 is rotatably mounted on a frame 15. The spindle 9 is urged in the direction of the frame 15 with a spring means 18. The spindle 9 can be downwardly pulled owing to a suitable means (not shown).

In an energy storing device having the above-described construction, a rotary force from, for example, a fly-wheel is applied to the portion of the spindle 9 that is given in the direction of the frame 15. When the spindle 9 is rotated, the second flange 6 is rotated but the first flange 5 cannot be rotated since it is stopped by a friction plate 16. This causes a relative rotation between the first and second flanges 5, 6 so that the energy storing cylinder 1 thereby receives a twisting force. Due to the twisting force, the portion of the cylinder 1 that is between the end surfaces 1c, 1d thereof is twisted. At this time, the spindle 9 is pulled downwardly. As the spindle 9 is lowered, the energy storing cylinder 1 is compressed via the gear 13, thrust bearing 14, and the first flange 5. As a result, the spring means 18 is lowered with the lowering of the spindle 9 and, even if a downwardly pulling force is released from the spindle 9, an upward movement of the spindle 9 can be prevented since the spindle 9 is pushed by the spring means 18.

The energy storing cylinder 1 thus compressed by the spring means 18 is deformed as shown in FIG. 4 such that it is contracted and thickened. As the cylinder 1 is thus deformed, energy of a rotary force and energy of a thrust are stored. This deformation takes place smoothly and stably owing to the special form of the energy storing cylinder 1 and the spiral groove 2. At this time, the specially shaped cylinder 1 the diameter of which is gradually increased from one end thereof to the other helps in smoothly compression-deforming the same in the direction of the axis thereof. In addition, the spiral groove 2 helps in smoothly twist-deforming the cylinder 1 in the direction of the rotation thereof.

When a rotary force applied to the portion of the spindle 9 that is on the side of the frame 15 is released therefrom, the energy storing cylinder 1 is so moved as to be returned to its original position as shown in FIG. 2. Consequently, the second flange 6 is rotated in a direction opposite to the one in which it was initially rotated, and the spindle 9 is then rotated in the same direction as the second flange 6. At this time, a thrust is exerted on the first flange 5 in a direction in which the first flange 5 is moved away from the second flange 6. Thus, the spindle 9 is upwardly moved as the rotation thereof is controlled by the spring means 18 to allow the energy storing cylinder 1 to be returned to its original form of the original length. The rotary force of the spindle 9 is transmitted to the gear 13 to allow a driven object (not shown), which is engaged with the gear 13, to receive the same. A thrust is withdrawn by the first flange 5 or spindle 9 or a member moved with the spindle 9.

The restoration of the energy storing cylinder 1 is effected rapidly in general cases. Then, a rotary force and a thrust occurring at this time are momentary ones of a greatly increased magnitude as compared with ones originally applied to the cylinder 1 for a long period of time. Such rotary force and thrust of an increased magnitude can be utilized as a kind of power for various purposes.

Since the energy storing device according to the present invention is provided with an elastic energy storing cylinder, a rotary force and a thrust can be stored simultaneously. In the device, the release of energy is effected momentarily and then, a great rotary force can be withdrawn. In addition, the energy storing cylinder is provided with a spiral groove in the outer surface thereof. This permits a smooth deformation of the device, a smooth storage of energy and an increase in durability thereof. Moreover, the device according to the present invention is simply constructed and then, it can be produced at a low cost with the reliability thereof much increased.

The present invention is not, of course, limited to the above embodiment; it may be modified in various ways within the scope of the appended claims.

What is claimed:

1. An energy storing device comprising an elastic energy storing cylinder of a diameter gradually increasing from one end thereof to the other which has a spiral groove in the outer surface thereof, first and second flanges fitted into both end portions of said cylinder so that they cannot be rotated relative to said cylinder, a spindle passed through said cylinder and said flanges so that it is rotatable and slidable with respect to said first flange but non-rotatable with respect to said second flange, and a gear non-rotatably fitted around one end of said spindle.

2. An energy storing device according to claim 1, wherein said first and second flanges have the respective boss portions extended along said spindle.

3. An energy storing device according to claim 1, wherein said gear is in contact with said first flange via a thrust bearing.

* * * * *